Figure 1:
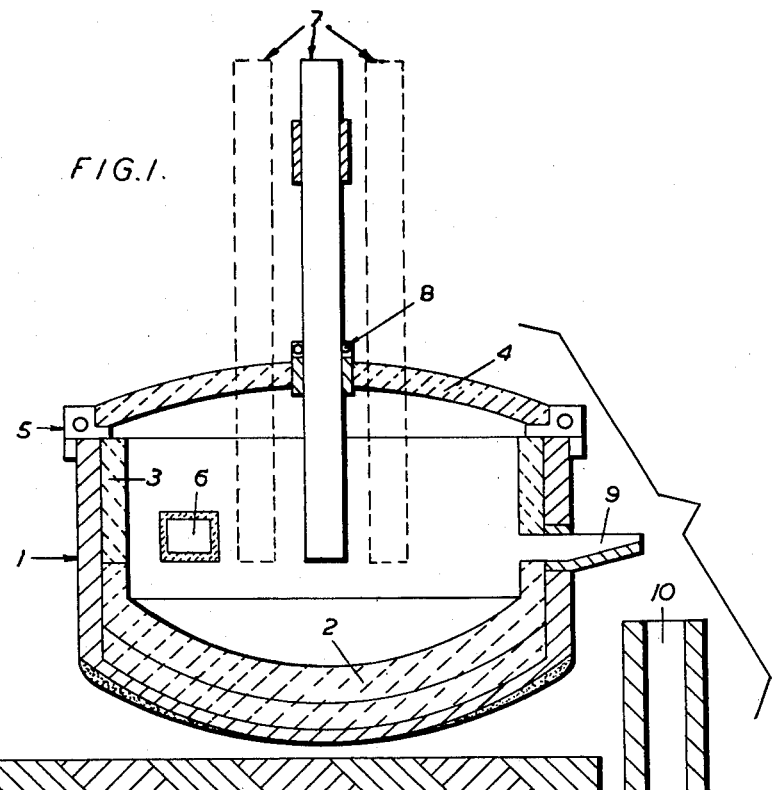

Jan. 24, 1956  T. HEWITT ET AL  2,732,294
MANUFACTURE OF COPPER
Filed Sept. 17, 1951  2 Sheets-Sheet 2

United States Patent Office
2,732,294
Patented Jan. 24, 1956

2,732,294

MANUFACTURE OF COPPER

Thomas Hewitt, Zamalek, Cairo, Egypt, and Herbert John Miller, Huyton, and Jesse Varley, Eccleston, England; said Miller assignor to British Insulated Callender's Cables Limited, London, England, a British company, and said Hewitt and said Varley assignors to British Copper Refiners Limited, London, England, a British company Application September 17, 1951, Serial No. 246,908

Claims priority, application Great Britain September 28, 1950

8 Claims. (Cl. 75—76)

This invention relates to an improved process for the production of phosphorus deoxidised copper in the form of billets, cakes and other shapes.

The conventional procedure in the manufacture of these products is based on the refining of blister copper and/or cathode copper and/or scrap materials in reverberatory and other furnaces, followed by the deoxidation of the refined copper with phosphorus as a separate subsequent stage. In the refining stage of the process there is appreciable oxidation, which is beneficial in removing sulphur and other impurities, either present in the initial material or picked up from the products of combustion of the fuel, and the oxidising phase is followed by the poling phase, which essentially reduces the oxygen content to a figure appropriate for tough pitch copper. The subsequent deoxidation stage, which is normally undertaken in small holding furnaces or ladles, involves the addition of phosphorus, generally as a master copper-phosphorus alloy (phosphor copper), the amount added being related to the oxygen content of the molten metal so that the final product will contain phosphorus within limits of 0.015% to 0.080%. The two distinct stages of refining and deoxidation involve considerable expense.

There is another process of obtaining phosphorus deoxidised copper based on the melting of refined or cathode copper, together with controlled amounts of selected scrap materials, in a restricted range of furnaces, examples of which are crucible furnaces, electric arc furnaces, electric induction furnaces, and carbon resistance furnaces. The melting operation is carried out under clean conditions so that there is no pick-up of sulphur and other impurities from fuels, and then to the molten metal the requisite amount of deoxidant is added. This method thus provides phosphorus deoxidised copper by a single stage process.

It will be seen from the preceding statements that for the production of phosphorus deoxidised copper in the form of billets, cakes and other shapes, there are at present in operation the two-stage process, which can take as input material blister copper, cathode copper and scrap copper, and the single stage process, limited to refined or cathode copper as input material. The present invention provides a single stage process employing as input material blister copper of appropriate composition, which is available in large quantities and is comparatively cheap. By this development important economic advantages are obtained.

In the new process the blister copper is melted under controlled conditions, which are such as to provide for reducing both the sulphur content and the oxygen content of the material of the charge, this melting being followed finally by deoxidation by means of phosphorus and the casting of the deoxidised metal into the required shapes.

Blister copper appropriate for treatment in accordance with the invention has a suitable basic composition with a sulphur content of not more than 0.03% and an oxygen content of from 0.1% to 0.5% and not more than 0.03% of iron and is substantially free from antimony, bismuth, lead, selenium and tellurium.

By "substantially free" we mean not containing more of these impurities than can be tolerated in the finished product, the elements concerned not being removed during the process. As an indication of the maximum contents of impurities which can be tolerated, the requirements of British Standard Specification No. 1172 for phosphorus deoxidised copper are quoted. This specification calls for the following composition:

| | Per cent |
|---|---|
| Copper (silver being counted as copper), not less than | 99.85 |
| Antimony, not more than | 0.005 |
| Arsenic, not more than | 0.05 |
| Bismuth, not more than | [1] 0.0030 |
| Iron, not more than | 0.030 |
| Lead, not more than | 0.010 |
| Nickel, not more than | 0.10 |
| Phosphorus: | |
|     Not more than | 0.080 |
|     Not less than | 0.02 |
| Tellurium, not more than | 0.010 |
| Selenium and tellurium together, not more than | 0.020 |
| Tin, not more than | 0.01 |
| Total of all impurities (excluding silver, nickel, arsenic and phosphorus), not more than | 0.060 |

[1] For certain grades this is reduced to 0.0015%.

In accordance with the invention, melting of the blister copper is carried out in a furnace of the kind in which gases generated by the combustion of fuel do not make contact with the molten copper (hereinafter referred to as the kind specified) under conditions in which the removal of volatile impurities is assisted. These conditions may include (1) a ventilating effect produced by the generation of neutral or reducing gases in the furnace, (2) a ventilating effect produced by the introduction of such gases in the furnace, or (3) the use of an absorbent cover on the metal. Two or more of these expedients may be employed simultaneously.

Furnaces suitable for the new process are electric furnaces of the direct arc and carbon resistance types and crucible furnaces, whether heated by solid, liquid or gaseous fuels or electrically heated by induction. Open flame furnaces, whether refractory or rotary, and whether fired by solid, liquid or gaseous fuels, are not satisfactory, since their use leads to a pick-up of sulphur in the course of melting.

Flux or other cover is provided when necessary to assist in the removal of sulphur or other impurities which tend to form slags. In some cases, particularly when a completely closed furnace which cannot be ventilated, such as a crucible furnace, is used, the removal of oxygen is provided for entirely by the use of a cover, such as a carbonaceous cover, with or without flux additions, on the copper. Such covers remain in position until the copper is poured from the furnace. Charcoal is a suitable carbonaceous cover. A suitable flux is a mixture of lime and soda ash.

In a carbon arc or carbon resistance electric furnace, the ventilating effect naturally existing in the furnace is assisted by gas liberated in the region of the arc or resistance comprised mainly of carbon dioxide. The movement of this gas sweeps away volatile impurities, particularly sulphur, the content of which is reduced to one third or less than one third of that in the initial charge of metal. Where insufficient gas is generated in this way, purified (sulphur free) gases such as nitrogen, carbon monoxide, carbon dioxide, and combinations of these may be admitted to the furnace or generated in the furnace by the adidtion of chemicals such as limestone and sulphur free carbonaceous matter.

After melting, and continued heating of the required extent, as ascertained from a sample taken from the molten metal, deoxidation is carried out. The sample may be analysed or be tested by observing the shape of its surface as cast. If the cast surface is substantially flat (indicating an oxygen content of about 0.04%) the copper is ready for phosphorus deoxidation. From these tests, in accordance with normal practice, the amount of phosphorus to be added, preferably as phosphor copper, is estimated. This quantity is sufficient to completely deoxodise the metal and leave residual phosphorus between the limits of 0.015% and 0.08%.

The molten metal after deoxidation is poured into moulds to give castings of the required shapes.

It has been found, for instance, that commencing with blister copper containing 0.03% of sulphur, 0.45% of oxygen and 0.01% of iron, the molten metal prior to deoxidation contains 0.008% of sulphur, 0.04% of oxygen and 0.001% of iron and after deoxidation 0.007% sulphur, no oxygen, .0001% iron and 0.04% phosphorus.

Figure 2:
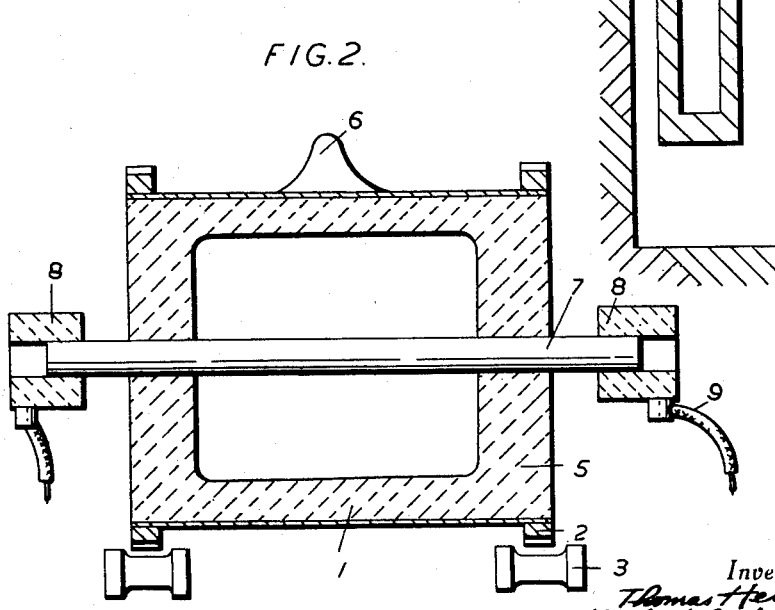
Figure 3:
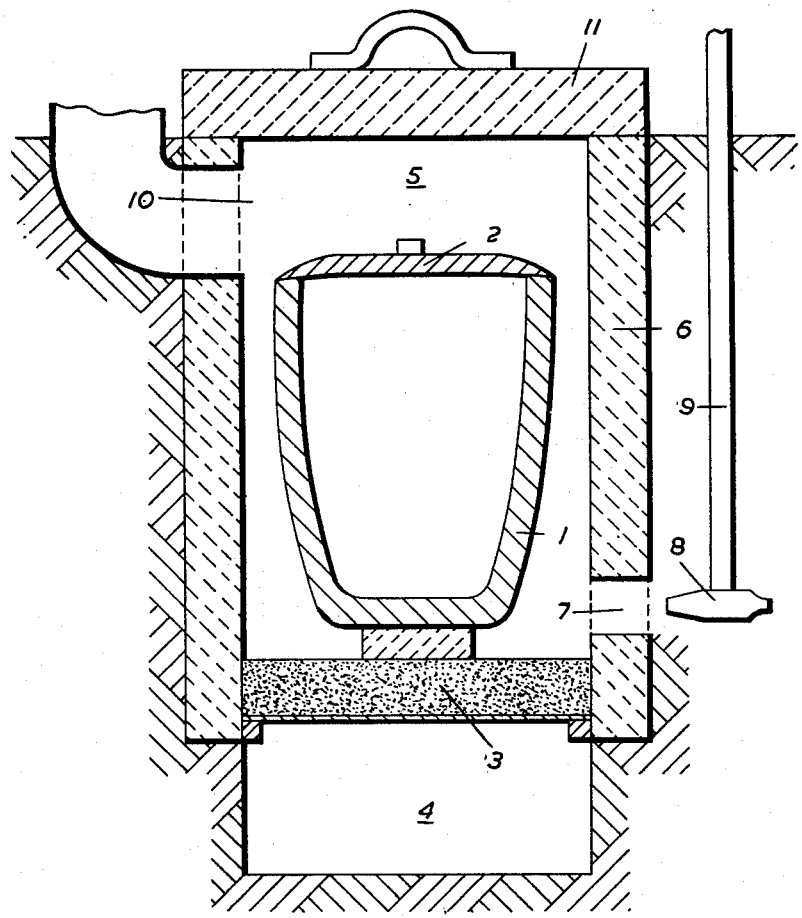

Three examples of methods of carrying out the process of the invention will be described with reference to the accompanying diagrammatic drawings, in which Figure 1 is an elevation in cross-section of an electric arc furnace. Figure 2 is an elevation in cross-section of an electric resistance furnace and Figure 3 is an elevation partly in cross-section of an oil heated crucible furnace.

In carrying out the process in an electric arc furnace of the kind shown in Figure 1, the blister copper is loaded into the furnace and melted, preferably under a cover of carbonaceous material and an alkaline flux.

Referring to Figure 1, the furnace body comprises a steel shell, which is lined in the hearth portion 2 with either a monolithic or a brick refractory lining of a high grade type to withstand the action of molten copper; chemically bonded magnesite is suitable for the actual hearth which is in contact with the copper. The side walls 3 are constructed with fireclay brick next the shell and refractory brick, such as magnesite, for the exposed portions.

The roof 4 comprises a heavy water-cooled steel ring 5 which carries the refractory roof, constructed in the normal sprung-arch manner. The roof assembly is designed for complete removal such as by lifting and swinging to one side or by other suitable means, so that on its removal the charge of blister copper and scrap may be made direct into the furnace body. In addition charging may be made through a side door 6 which is also used for making additions of fluxes and deoxidants and also for removal of slag.

Three graphite electrodes 7 each connected to one phase of an A. C. supply project into the furnace through suitable ports in the roof, there being provisions for water cooled rings 8 at the intervening position.

The launder 9 is arranged for pouring by lip-axis or central-axis methods, the former being preferable.

As melting and continued heating of the molten copper proceeds, gas is liberated from the region of the arc, composed mainly of carbon dioxide. Further ventilation may be provided as required, by removing a brick from the refractory roof. If additional oxygen is required, for the adequate removal of sulphur, air may be admitted by removing part of the material by which the launder 9 is normally sealed during the melting process.

The metal after melting is stirred and the slag is skimmed. When tests of the copper show that it has reached a suitable stage for phosphorus deoxidation, this is carried out by adding a calculated quantity of phosphor copper. On completion of the phosphorus deoxidation the copper is poured into moulds 10, which are brought into position beneath the lip of the launder by any convenient process, such as mechanical wheel or straight line conveyor.

When using a resistance furnace of the kind shown in Figure 2, a similar process is followed except that ventilating is carried out by rotating the furnace until the launder is uppermost and removing sufficient of the material normally used for sealing it.

Referring to Figure 2, the furnace comprises, a cylindrical steel shell 1 supported by end rings 2 which run on seatings 3 in such a way that the cylindrical furnace can be rotated about its central axis. The steel shell 1 has a refractory lining 5 formed with two apertures through which the carbon resistor 7 fits and with a tap hole to which is connected a pouring spout 6. Electric contacts 8 connected to supply cables 9 at each end of the carbon resistor 7 make a running joint with the carbon resistor, in such a way that axial rotation of the furnace is possible without disconnecting the resistor from the electricity supply.

The third form of furnace suitable for use in accordance with the invention, is shown in Figure 3. This is an oil heated crucible furnace. With this type of furnace it is essential to use a carbonaceous cover to remove oxygen. The refractory crucible 1 having a gas tight lid 2 is mounted on a sand bed 3 over a pit 4 inside a chamber 5 with insulating brick walls 6. One wall is apertured at 7 to admit the flame from an oil injector burner 8 fed by an oil supply pipe 9 and the other wall is apertured at 10 to form a flue. It is preferable to use a fuel with a low sulphur content to avoid the possibility of sulphur being absorbed by the copper through the wall of the refractory crucible 1. The chamber is closed by a lid 11.

Instead of using an oil burner such as 7 for the heating of the crucible 1 it is possible to use electric induction heating by means of a cylindrical coil surrounding the crucible. This has the advantage of completely eliminating the possibility of contaminating the copper by the combustion products of the fuel but the disadvantage of high power consumption.

The mechanical and fabricating properties of the cast products obtained from the new process are equivalent to those obtained with either of the other methods at present in operation. The products of the new process can be worked satisfactorily by rolling, extrusion, drawing and other fabrication methods. Products of the improved manufacture showing a composition of 99.9% copper, 0.04% phosphorus, 0.009% sulphur and 0.001% iron on analysis have been prepared in carbon resistance and crucible furnaces of the kinds described and have shown the following properties in test:

Hot worked:
    Ultimate tensile strength_____ 16.1 tons/sq. inch.
    Elongation _____ 55% on 2".
Cold worked (reduction of
  80% by drawing):
    Ultimate tensile strength_____ 32.5 tons/sq. inch.
    Elongation _____ 1% on 2".
Annealed in hydrogen at 700° C.:
    Ultimate tensile strength_____ 15.8 tons/sq. inch.
    Elongation _____ 57% on 2".

It is obvious that similar results can be attained using a carbon arc furnace.

What we claim as our invention is:

1. A single stage process for the production of phosphorus deoxidised copper which comprises the steps of introducing into a furnace, of the kind in which gases generated by the combustion of fuel do not make contact with the contents of the furnace, blister copper containing not more than 99.8% copper, not more than 0.03% sulphur, from 0.1% to 0.5% oxygen, not more than 0.03% iron and substantially no antimony, bismuth, lead, selenium or tellurium, melting said copper, controlling the conditions in the furnace to assist the removal of volatile impurities during said melting, continuing the heating of said molten copper under said controlled conditions until its composition is suitable for phosphorus deoxidation, adding sufficient phosphorus to said copper to completely deoxidise said copper and casting said copper into moulds.

2. A single stage process for the production of phosphorus deoxidized copper which comprises the steps of introducing into a furnace, of the kind in which gases generated by the combustion of fuel do not make contact with the contents of the furnace, blister copper containing not more than 99.8% copper, not more than 0.03% sulphur, from 0.1% to 0.5% oxygen, not more than 0.03% iron and substantially no antimony, bismuth, lead, selenium or tellurium, melting said copper, producing a ventilating effect in the furnace to assist the removal of volatile impurities, continuing the heating of said molten copper until its composition is suitable for phosphorus deoxidation, adding sufficient phosphorus to said copper to completely deoxidise said copper and casting said copper from the furnace into moulds.

3. A single stage process for the production of phosphorus deoxidized copper which comprises the steps of introducing into a furnace, of the kind in which gases generated by the combustion of fuel do not make contact with the contents of the furnace, blister copper containing not more than 99.8% copper, not more than 0.03% sulphur, from 0.1% to 0.5% oxygen, not more than 0.03% iron and substantially no antimony, bismuth, lead, selenium or tellurium, melting said copper, providing a carbonaceous cover on said copper, continuing the heating of said molten copper under said cover until its composition is suitable for phosphorus deoxidation, adding sufficient phosphorus to said copper to completely deoxidize said copper and casting said copper from the furnace into moulds.

4. A single stage process for the production of phosphorus deoxidised copper which comprises the steps of introducing into a carbon arc electric furnace blister copper containing not more than 99.8% copper, not more than 0.03% sulphur, from 0.1% to 0.5% oxygen, not more than 0.03% iron and substantially no antimony, bismuth, lead, selenium or tellurium, melting said copper, continuing the heating of said molten copper while ventilating said furnace as necessary to allow the escape of volatile impurities and gases generated by decomposition of the furnace electrodes until its composition is suitable for phosphorus deoxidation, adding sufficient phosphorus to said copper to completely deoxidise said copper and casting said copper from the furnace into moulds.

5. A single stage process for the production of phosphorus deoxidised copper which comprises the steps of introducing into a carbon resistance electric furnace blister copper containing not more than 99.8% copper, not more than 0.03% sulphur, from 0.1% to 0.5% oxygen, not more than 0.03% iron and substantially no antimony, bismuth, lead, selenium or tellurium, melting said copper, continuing the heating of said molten copper, while ventilating said furnace as necessary to allow the escape of volatile impurities and gases generated by decomposition of the furnace electrodes until its composition is suitable for phosphorus deoxidation, adding sufficient phosphorus to said copper to completely deoxidise said copper and casting said copper from the furnace into moulds.

6. A single stage process for the production of phosphorus deoxidised copper which comprises the steps of introducing into a furnace, of the kind in which gases generated by the combustion of fuel do not make contact with the contents of the furnace, blister copper containing not more than 99.8% copper, not more than 0.03% sulphur, from 0.1% to 0.5% oxygen, not more than 0.03% iron and substantially no antimony, bismuth, lead, selenium or tellurium, melting said copper, controlling the conditions in the furnace to assist the removal of volatile impurities during said melting, providing a cover on said metal comprising at least one of the following, carbonaceous materials and alkaline fluxes, continuing the heating of said molten copper under said controlled conditions until its composition is suitable for phosphorus deoxidation, adding sufficient phosphorus to said copper to completely deoxidise said copper and casting said copper into moulds.

7. A single stage process for the production of phosphorus deoxidised copper which comprises the steps of introducing into a carbon arc electric furnace blister copper containing not more than 99.8% copper, not more than 0.03% sulphur, from 0.1% to 0.5% oxygen, not more than 0.03% iron and substantially no antimony, bismuth, lead, selenium or tellurium, melting said copper, providing a cover on said metal comprising at least one of the following, carbonaceous materials and alkaline fluxes, continuing the heating of said molten copper while ventilating said furnace as necessary to allow the escape of volatile impurities and gases generated by decomposition of the furnace electrodes until its composition is suitable for phosphorus deoxidation, adding sufficient phosphorus to said copper to completely deoxidise said copper and casting said copper from the furnace into moulds.

8. A single stage process for the production of phosphorus deoxidised copper which comprises the steps of introducing into a carbon resistance electric furnace blister copper containing not more than 99.8% copper, not more than 0.03% sulphur, from 0.1% to 0.5% oxygen, not more than 0.03% iron and substantially no antimony, bismuth, lead, selenium or tellurium, melting said copper, providing a cover on said metal comprising at least one of the following, carbonaceous materials and alkaline fluxes, continuing the heating of said molten copper, while ventilating said furnace as necessary to allow the escape of volatile impurities and gases generated by decomposition of the furnace electrodes until its composition is suitable for phosphorus deoxidation, adding sufficient phosphorus to said copper to completely deoxidise said copper and casting said copper from the furnace into moulds.

References Cited in the file of this patent

UNITED STATES PATENTS

| | | |
|---|---|---|
| 2,060,073 | Heuer | Nov. 10, 1936 |
| 2,060,133 | Summey | Nov. 10, 1936 |
| 2,102,742 | Poland | Dec. 21, 1937 |

OTHER REFERENCES

"Handbook of Non-Ferrous Metallurgy" by Liddell, 2nd ed., vol. 2, 1945, page 248.